(No Model.) 2 Sheets—Sheet 2.

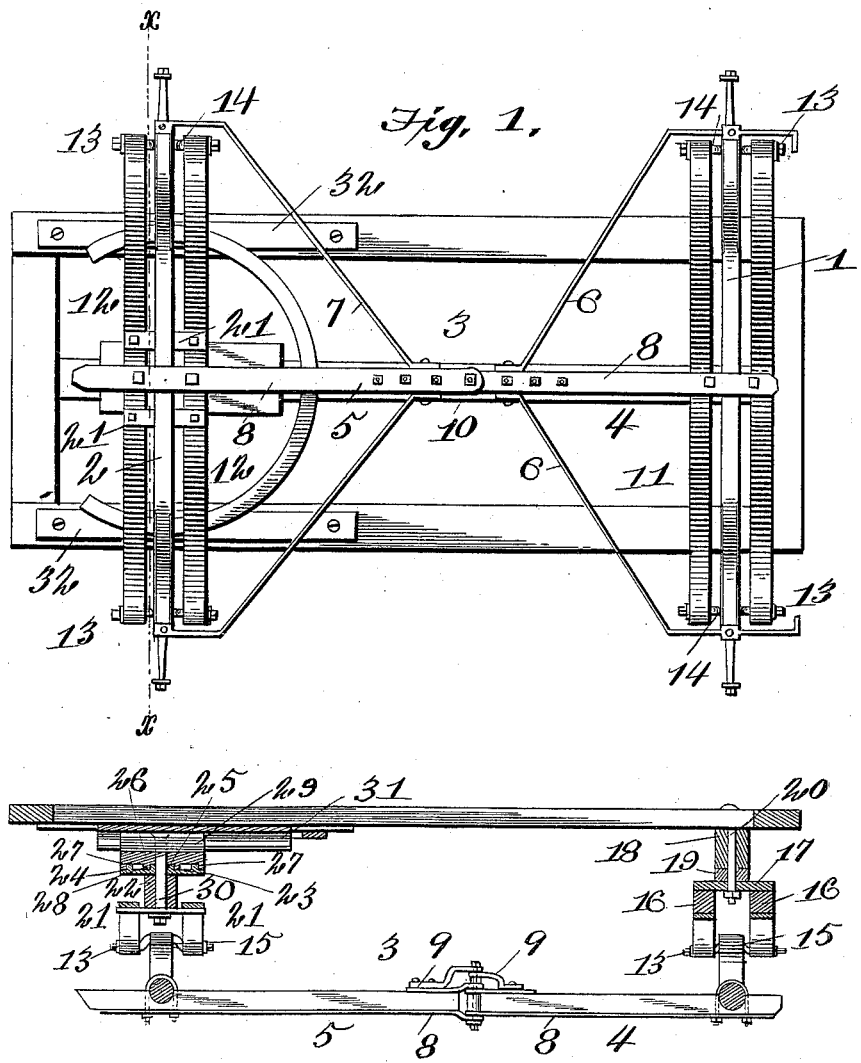

M. MAHER.
VEHICLE RUNNING GEAR.

No. 533,133. Patented Jan. 29, 1895.

WITNESSES  
J. W. Johnson  
Francis Robinette

INVENTOR  
Michael Maher  
By J. R. Nottingham  
Atty.

UNITED STATES PATENT OFFICE.

MICHAEL MAHER, OF ONEIDA, NEW YORK.

VEHICLE RUNNING-GEAR.

SPECIFICATION forming part of Letters Patent No. 533,133, dated January 29, 1895.

Application filed August 8, 1894. Serial No. 519,766. (No model.)

*To all whom it may concern:*

Be it known that I, MICHAEL MAHER, a citizen of the United States, residing at Oneida, in the county of Madison and State of New York, have invented certain new and useful Improvements in Vehicle Running-Gear; and I do hereby declare the following to be a full, clear, and exact description of the invention, such as will enable others skilled in the art to which it appertains to make and use the same.

The invention relates to improvements in vehicle running-gears, generally, but more particularly to that class of running-gears commonly known as "double-oscillating," in which both the front and rear axle oscillate or turn horizontally to give a "cramping" motion to the wheels; and said invention consists in certain details of construction, and the combination and arrangement of the various parts, as will be hereinafter more fully described and specifically pointed out in the claims.

The principal object of the invention is to provide a cheap and simple means, whereby an exceedingly short turn of a vehicle, having a "low-down" body, may be attained with perfect ease and safety. This object I attain by means of the mechanism illustrated in the accompanying drawings, in which—

Figure 3:
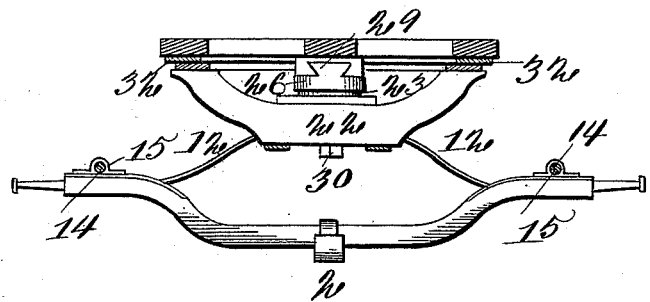

Figure 1 represents a bottom plan view of my improved running-gear; Fig. 2, a longitudinal vertical section of the same; Fig. 3, a transverse vertical section, on line $x\ x$ of Fig. 1, and Fig. 4, a bottom plan view, showing the position the parts assume in turning.

Similar reference numerals indicate similar parts throughout the several views, in which—

The numerals 1 and 2 indicate the front and rear axles, respectively, which may be of any suitable or preferred kind. Those shown in the drawings are of the "bent" pattern. Said axles are connected together by a reach, 3, which is divided near the center into two sections 4 and 5, the forward section being rigidly braced to the front axle by diverging braces 6, and the rear section rigidly braced to the rear axle by diverging braces 7. The inner end of each section is provided, top and bottom, with hinge leaf-plates, 8, and with a security-iron, 9, having an apertured head in line with the apertured ends of the hinge leaf-plates to receive a security-bolt, 10, which unites the two sections together with a hinge-joint. The reach is proportioned according to the length and width of the body, and may be used in connection with any variety of spring and axle, ordinarily employed in running-gears wherein a reach is used.

The numerals 11 and 12 indicate the front and rear springs, respectively, each spring being composed of two semi-elliptic plates or leaves, arranged parallel with each other, on each side of the axle, and having their curved ends attached to the arms 13 of a centrally-bent rock-shaft, 14, which is journaled in a bearing, 15, secured upon the axle. To each plate or leaf comprising the front spring is bolted a bolster-block 16, and a bridge-plate 17, centrally perforated, unites the two bolster-blocks, and consequently the spring-plates or leaves firmly together. Secured to the under side of the body is a head-block, 18, which is provided with a plate, 19, and a screw-threaded bolt, 20, passes through the perforated plate 17 to form a pivotal connection between the forward part of the running-gear and body. The two plates or leaves comprising the rear spring are joined together by two bridge-plates 21 and bolted to said bridge-plates, between the spring-plates or leaves, is a head-block, 22, which is provided with the usual king-bolt hole and carries a section of the fifth wheel. Securely bolted to the head-block is an apertured plate, 23, provided with a circular rabbet, 24, and with a central hub, 25, registering with the king-bolt hole.

The numeral 26 indicates a circular centrally apertured plate, which is provided with a rim, 27, adapted to be seated in the circular rabbet 24, and with a collar, 28, adapted to receive the hub 25, of the plate 23. The plate 26 is provided with a dove-tailed slide, 29, carrying a king-bolt 30, said slide being adapted to reciprocate in longitudinal ways made in a guide-plate, 31, which is secured to the under side of the body. The king-bolt 30 passes down through the apertures in the plates 23 and 26 and head-block, and securely holds the parts together. Secured to the under side of each side sill of the body is a plate 32, which form the other sections of the fifth-wheel.

While I have shown and described the springs as being composed of two semi-elliptic plates or leaves, it will be evident that other forms of springs may be employed, without departing from the spirit of my invention.

Figure 4:
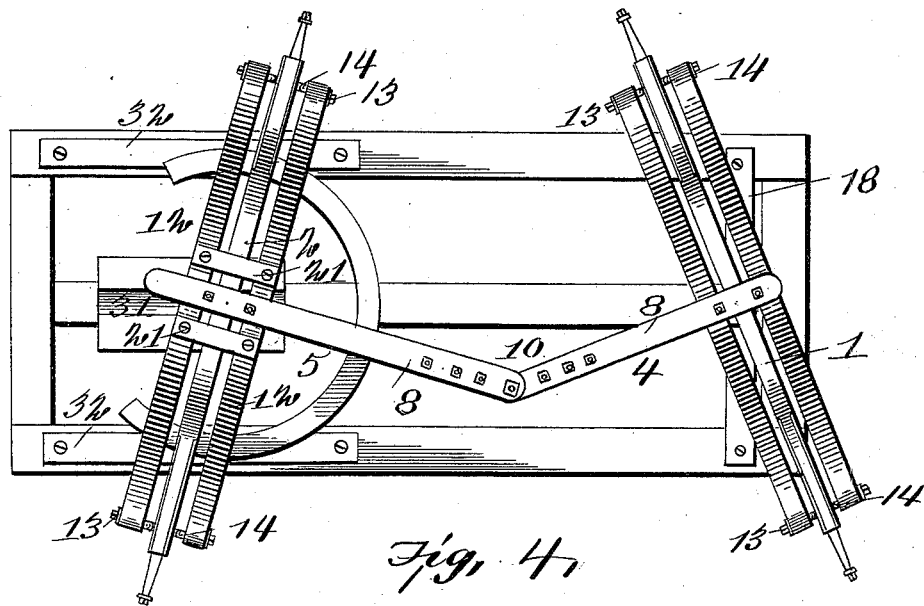

The operation of the several parts will be readily understood from the above description, without further explanation other than to state that owing to the forward section of the reach being slightly shorter than the rear section, it will be seen that the front wheels are caused to "cut in" quicker than the rear wheels, as shown in Fig. 4, and this feature, together with the sliding connections between the rear parts of the running-gear, and the pivotal connection between the forward parts of the same, permits of a much shorter turn being made than is usual with vehicles having divided reaches especially those having low hung bodies. By means of the sliding connection the reach is permitted to shorten and lengthen accordingly as the axles are turned on their pivotal bolts, from a horizontal position to an oblique position, and from the latter back to their normal position.

Some of the advantages to be derived from my invention, are, first, that a much shorter turn can be made than is usual with vehicles of this class; second, the great convenience in loading and unloading the vehicle, and, third, the facility with which persons may step in and out of the rear portion of the vehicle, as the rear wheels may be so cut or turned as to be entirely out of the way.

Having thus fully described my invention, what I claim as new, and desire to obtain by Letters Patent, is—

1. In a vehicle running-gear, the combination, with the front and rear axles, of a divided and hinged reach, a pivotal connection between the front axle and body and a sliding connection, between the rear axle and the body, consisting of a dove-tailed slotted block and a dove-tailed slide working in said slotted block and a king-bolt connecting the parts together, substantially as specified.

2. The combination, with a vehicle body, springs, and axles connected by a divided and hinged reach, of a pivotal connection between the forward part of the running-gear and body, a sliding-connection between the rear part of the running-gear, and body, said sliding-connection comprising a dove-tailed slotted block and a dove-tailed slide, working in said slotted block and carrying a king-bolt passing through the head-block secured to the rear spring, substantially as specified.

3. The combination, with the body, the axles connected by a divided and hinged reach, and the front and rear springs having their ends attached to rock-shafts journaled upon their respective axles, of a pivotal connection between the front head-block and spring, a head-block secured to the rear spring, and a sliding-connection, comprising a slotted block secured to the body and a slide operating in said slotted block and carrying a king-bolt passing through said head block, substantially as specified.

In testimony whereof I affix my signature in the presence of two witnesses.

MICHAEL MAHER.

Witnesses:
W. E. NORTHRUP,
F. B. RATNOUR.